United States Patent [19]

Lindgren

[11] Patent Number: 4,758,204
[45] Date of Patent: Jul. 19, 1988

[54] TRANSMISSION SYSTEM

[75] Inventor: Mats E. G. Lindgren, Vikmanshyttan, Sweden

[73] Assignee: Fiber Mechanics AB, Stockholm, Sweden

[21] Appl. No.: 112,003

[22] Filed: Oct. 23, 1987

[30] Foreign Application Priority Data

Oct. 31, 1980 [SE] Sweden .............................. 8007682

[51] Int. Cl.$^4$ .............................................. F16C 1/00
[52] U.S. Cl. .................................... 464/181; 464/183
[58] Field of Search .............................. 464/181–183, 464/179, 158, 903, 97; 138/109, 130, 132, 174; 301/124 R, 126

[56] References Cited

U.S. PATENT DOCUMENTS

| | | | |
|---|---|---|---|
| 2,001,167 | 5/1935 | Swennes | 464/181 X |
| 4,089,190 | 5/1978 | Worgan et al. | 464/181 X |
| 4,187,135 | 2/1980 | Yates et al. | 138/109 X |
| 4,218,895 | 8/1980 | Smith et al. | |
| 4,236,386 | 12/1980 | Yates et al. | 138/109 X |
| 4,272,971 | 6/1981 | Loyed et al. | 138/174 X |
| 4,325,174 | 4/1982 | Smith et al. | |

Primary Examiner—John M. Jillions
Attorney, Agent, or Firm—Sughrue, Mion, Zinn, Macpeak, and Seas

[57] ABSTRACT

A transmission system for transmitting essential torque between two locations whose relative positions can change within certain limits, such as between the gearbox and rear axle of an automobile. The system includes a flexible shaft of fibre-reinforced plastics material which connects said locations. The two ends of the shaft are rigidly attached at said locations and the shaft has a sufficiently low Young's modulus in the longitudinal direction and low flexural stiffness to enable positional changes between said locations to be taken up by bending of the shaft. To this end the shaft has the form of a coreless tubular shaft in which the tubular wall comprises a substantially homogenous material with the fibres distributed substantially uniformly over the whole cross-section. The fibres are suitably carbon fibres, forming an angle to the longitudinal direction of the shaft of between ±40° and ±50°, preferably between ±43° and ±47°.

2 Claims, 2 Drawing Sheets

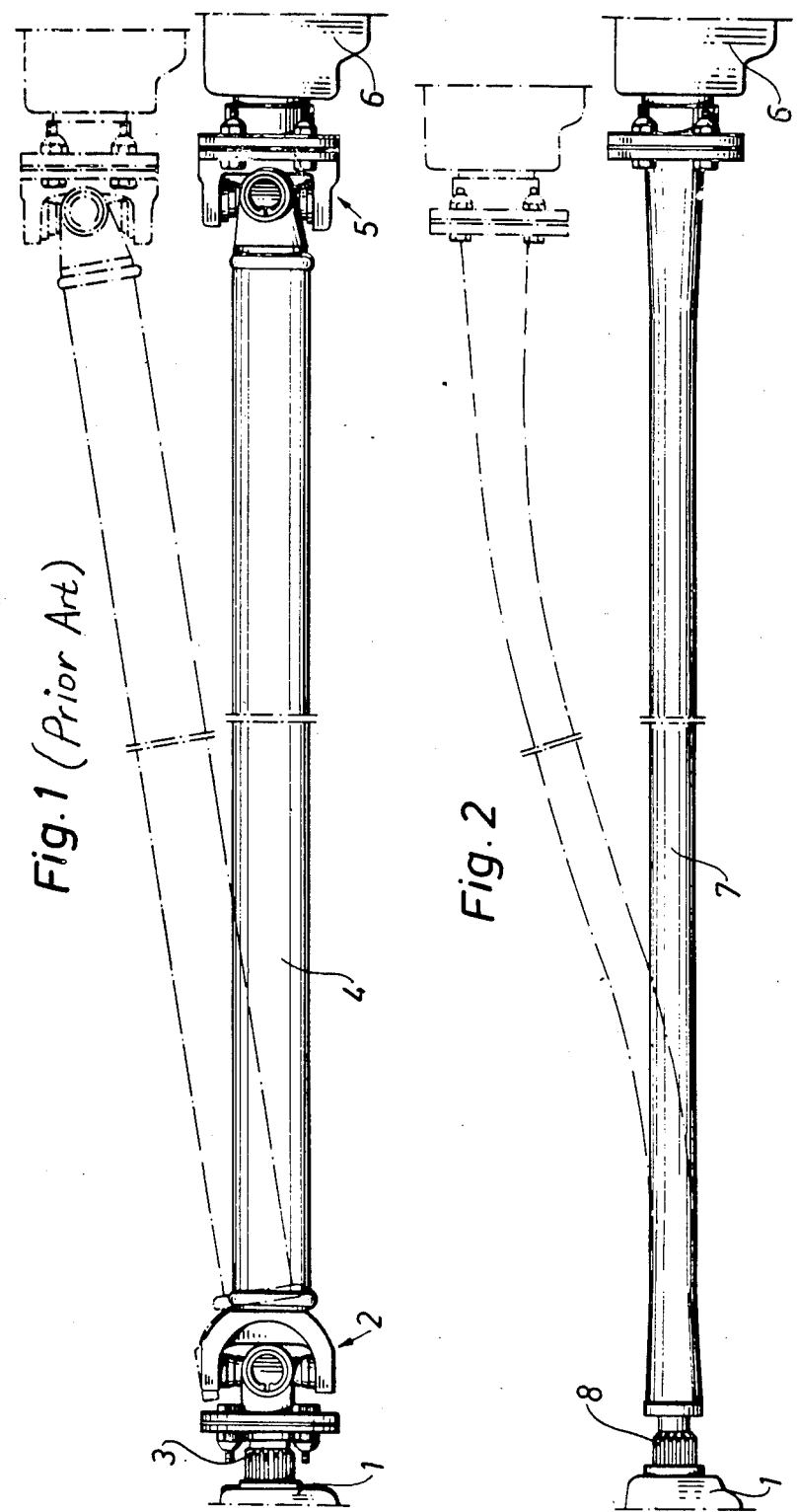

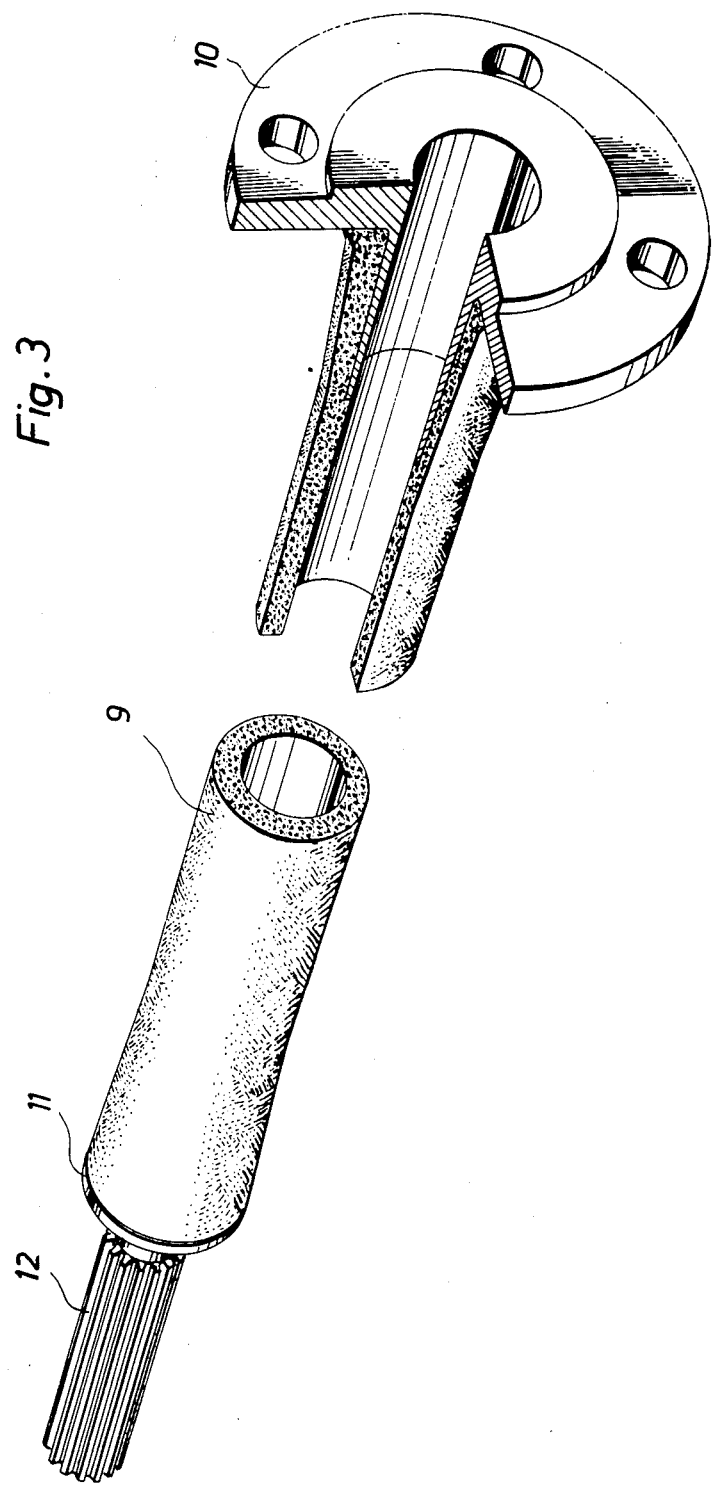

TRANSMISSION SYSTEM

This is a continuation of application Ser. No. 313,720, filed Oct. 21, 1981, now abandoned.

The present invention relates to a transmission system for transmitting essential torque between two locations, the relative positions of which can change within certain limits, said system including a flexible shaft of fibre-reinforced plastics material connecting said locations together.

A well-known example of one application where torque is to be transmitted between two locations which are not fixed relative to one another but where both limited linear and angular relative displacements may occur is the connection between the output shaft of the gearbox of an automobile and the axle spindle or trunnion of the drive differential in the rear axle. In present day automobiles said output shaft and said axle spindle or trunnion are connected by means of a universal driving shaft which includes two universal joints and an intermediate shaft, which is often tubular, and also a splined coupling to enable axial displacement. Efforts are made, however, to avoid angular differences between said output shaft and trunnion, since such differences can result in uneven rotation. In this respect, it may be necessary to include further universal joints between the two outer universal joints.

Such universal driving shafts have been well tried and are in general use. The use of universal driving shafts, however, presents certain problems and disadvantages, which have caused efforts to be made to find other methods of transmitting torque. Even when comprising only two universal joints, a universal driving shaft is a relatively complicated system, which, inter alia, normally includes eight bearings each having about 20 rolling elements which makes the shaft expensive to manufacture and to maintain. In addition, a universal driving shaft is relatively heavy.

It has previously been proposed, see for example the U.S. Pat. No. 4,089,190, to replace the intermediate steel shaft of a universal driving shaft with a shaft of fibre-reinforced plastics material, particularly a carbon fibre laminate, thereby partly to decrease the weight of the transmission system and partly to dampen the transmission of noise and vibrations from the engine to the rear axle. In this patent specification, according to which only the said steel intermediate shaft is replaced with a shaft of fibre material, while the universal joints are retained, two dimensional criteria are given, which can be summarized as follows. The shaft must have a sufficiently low elasticity modulus so as not to transmit vibrations from the engine to the rear axle, although it must be ensured, at the same time, that sufficient rigidity is obtained so as to prevent any appreciable difference between the geometric axis of the universal driving shaft and its axis of rotation at the revolutionary speed in question, which phenomenon is designated "whirling". Even though the intermediate steel shaft is replaced, in accordance with this patent, with a shaft of fibre material a transmission system according to said patent will still incorporate conventional universal joints, as is evident, for example, from Example 1 of the patent specification, and hence the costs entailed by and the problems encountered with said joints are not avoided.

The use of universal joints which provide pivotal attachment of the shaft at both ends thereof require a relatively stiff shaft in order to avoid bending or flexing problems. Such a relatively bending-resistant shaft cannot, on the other hand, be connected between the gearbox and rear axle without the use of universal joints.

The object of the present invention is to provide a transmission system of the kind described which is much lighter, simpler and cheaper than known transmission systems with respect to both manufacture and to maintenance.

To this end there is provided in accordance with the invention a transmission system which is characterized by the combination in which the two ends of the flexible shaft are rigidly attached at respective ones of the locations between which torque is to be transmitted, and the shaft has a sufficiently low Young's modulus in the longitudinal direction and low flexural stiffness to enable any positional changes between said locations to be taken up by bending of the shaft, to which end the shaft has the form of a coreless tubular shaft in which the tubular wall comprises a substantially homogenous material with the fibres distributed substantially uniformly over the whole cross-section. By means of this combination the universal joints are totally eliminated and thus a conventional universal driving shaft system can be replaced with a single flexible shaft. The expression "flexural stiffness" used in the specification and claims means the product of Young's modulus times the second moment of area, i.e. EI.

The solution afforded by the present invention is based on the concept that if the pivotal attachment of a flexible shaft, by means of universal joints, is replaced with a rigid attachment the shaft can be designed with a much lower flexural stiffness while retaining a high, critical revolutionary speed for flexural deviations, thereby enabling the shaft to connect the gearbox and the rear axle of, for example, a car without using universal joints.

In accordance with one embodiment of the invention, at least one end of the shaft is attached by means of a splined coupling. In accordance with an alternative embodiment the shaft is firmly attached at both ends, whereat distance changes between the attachment locations are taken up by bending of the flexible shaft.

In order to obtain the best torque transmission efforts should be made to place the fibres in the directions of the main stresses in torsion, that is so that they form an angle of approximately ±45° relative to the longitudinal axis. In order to obtain the desired low elasticity modulus of the shaft, the angle at which the fibres are laid should not be less than about 40° to the longitudinal axis of the shaft. Such a shaft, in which the fibres form an angle of between ±40° and ±50°, preferably between ±43° and ±47°, with the longitudinal axis of the shaft, which shaft, for example, may be made of a carbon-fibre reinforced plastics material, obtains a high shear modulus in the directions of the main stresses and a very low elasticity modulus in the longitudinal direction of the shaft. In other words, the shaft obtains ideal properties for conveying torque but is unable to transmit appreciable bending forces.

Further characterizing features of the invention are disclosed in the attached claims.

The invention will now be described in more detail with reference to the accompanying drawing, in which FIG. 1 illustrates a conventional transmission system which incorporates a universal drive shaft;

FIG. 2 illustrates a transmission system according to the invention; and

FIG. 3 illustrates the shaft of the system of FIG. 2, partially in crossection.

In FIG. 1 the reference 1 identifies the gearbox of a car engine, while the reference 2 identifies a universal joint connected to the output shaft of the gearbox over a splined coupling 3. The reference 4 identifies the tubular shaft normally connecting the universal joint 2 with a universal joint 5, which is connected to the axle spindle of the differential in the rear shaft 6. Those support bearings or intermediate universal joints which may be required in conventional transmission systems have not been shown in FIG. 1.

The full lines illustrate the position of the rear shaft 6 when the spring suspension is in a steady state, while the broken lines indicate a position in which the rear shaft has been displaced as a result of movement in said spring suspension. The universal joints 2 and 5 adjust so that the rectilinear shaft 4 is able to transmit the requisite torque to the rear axle 6 even when the rear axle occupies the position shown in broken lines. The system, however, should be so constructed as to avoid angular displacement between the output shaft of the gearbox and the spindle of the drive differential connected by said drive shaft, since otherwise the shaft may rotate unevenly.

FIG. 2 illustrates a corresponding transmission system constructed in accordance with the invention. The universal drive shaft 4 and universal joints 2 and 5 of FIG. 1 are replaced with a single flexible shaft 7 made of a fibre-reinforced material, preferably a carbon-fibre reinforced plastics material. The shaft 7 is rigidly connected, i.e. not pivotally connected, to both the output shaft of the gearbox 1 and the axle spindle of the differential. FIG. 2 also illustrates in full lines the position of the rear axle when the suspension is in a sustained state, and in broken lines a change in axle position due to spring movement. In this case the relative displacement between the output shaft of the gearbox and the axle spindle of the differential is accommodated by bending of the flexible shaft 7. Angular displacements between the output shaft and the axle spindle is permitted in this case.

The rigid attachment of the two ends of the flexible shaft may either be effected by means of fixed flanges arranged at both ends of said shaft or by means of a flange joint arranged at one end of the shaft and a splined coupling 8 arranged at the other end thereof. When the flexible shaft is connected by means of two fixed flange joints, distance changes between gearbox and rear axle must be taken up by bending of the flexible shaft 7. The length of the shaft is therefore selected so as to correspond to the greatest distance between gearbox and rear shaft. When the distance between gearbox and rear axle decreases from the maximum, the shaft 7 will bend.

When making a comparison between a pivotally attached drive shaft according to the previously mentioned U.S. Pat. No. 4,089,190 and a rigidly attached drive shaft accoring to the invention the following result is obtained. As the inherent mass of the shaft represents a socalled distributed load the downward bending, $\delta$, is determined by the following standard formuli:

$$\text{Pivotally attached shaft: } \delta_{max} = \frac{5\,QL^3}{384\,EI}$$

$$\text{Rigidly attached shaft: } \delta_{max} = \frac{QL^3}{384\,EI}$$

wherein
$Q$ = the mass of the shaft,
$L$ = the shaft length,
$E$ = the Young's modulus and
$I$ = the second moment of area.

It will be seen from the above formulas that in the case of drive shafts which are otherwise identical the extent to which the rigidly attached shaft bends downwardly is only 1/5th of that to which the pivotally attached shaft will bend.

The formula for the critical rotational speed for flexural bending of the shaft is:

$$n_{crit} = K\frac{1}{\sqrt{\delta_{max}}}$$

wherein K is a constant.

This means that the critical revolutionary speed of a given shaft increases $\sqrt{5}$ times, i.e. about 2.23 times, when the shaft attachment is changed from a pivotal attachment to a rigid attachment. Thus, this means that for a given shaft of a given desired least critical revolutionary speed, the diameter and/or wall thickness can be greatly reduced when changing from a pivotal to a fixed attachment, which enables the shaft to be of a much more slender design with decreased bending stresses as a result thereof, which in turn enables such a shaft, for example, to be connected between the gearbox and rear axle of a car without the use of universal joints.

It is stated in column 3 of the U.S. Pat. No. 4,089,190 that $EI/L^4DPt$ should be at least 40 with the dimensions given. However, when the product DPtL is proportional to the mass Q of the shaft, the expression $EI/L^4DPt$ is thus proportional to $EI/L^3Q$, which in turn is proportional, in accordance with the above, to $1/\delta_{max}$. When this factor is thus decreased by 1/5th in the case of a rigid attachment according to the invention, the condition can be made that $EI/L^4DPt$ shall be at least 8, instead of 40 according to the U.S. patent, while retaining the same critical revolutionary speed as the said U.S. patent. This also illustrates that a rigidly attached shaft according to the invention can be of much more slender design than known, pivotally attached shafts, which means, for example, that universal joints can be eliminated when applied to automobiles.

In order to obtain a shaft having optimal properties with respect to torque transmission and which present no problems with regard to bending stresses, attempts should be made to arrange the fibres so that they extend substantially in the directions of the main stresses in torsion, that is at an angle of substantially $\pm 45°$ to the longitudinal axis of the shaft. Certain angular deviations may occur for reasons associated with the winding technique applied, whereat the winding angle will normally lie between $\pm 43°$ and $\pm 47°$. It should be ensured, however, that the winding angle is not less than 40° relative to the longitudinal axis. It should be ensured that no fibres extend substantially parallel with the longitudinal axis of the shaft, as such fibres increase the flexural stiffness of the shaft without increasing the torsional stiffness thereof.

FIG. 3 illustrates the construction of an embodiment of a shaft forming part of a transmission system according to the invention. This shaft comprises a tubular shaft 9 of homogenous material. The shaft is manufactured by winding bunches of carbon fibres backwards and forwards around a core in a manner known per se, subsequent to first passing said fibre bunches through a thermoplastic resin. The angle at which the fibres are wound is about ±45°. This provides a fabric-like structure and uniform distribution of the fibres over the whole cross-section of the shaft. Consequently, the whole of the wall of the tubular shaft will be homogenous throughout, which is important. Subsequent to winding the fibres about the core, the winding is hardened on the core and the core then withdrawn. In use the shaft should not comprise any core, since this would lower the natural or inherent frequency of the shaft and represent a non-active mass.

End flanges 10 and 11 are firmly held by the winding at the ends of the shaft, of which flanges one, 10, is intended for fixedly mounting the shaft at one end therof, while the other flange, 11, is arranged to co-act with a part 12 of a splined coupling.

A typical example where the invention can be applied is a European car of average size, where the requisite torque transmission ability is 150 kpm, the maximum number of revolutions normally lying at about 5000 rpm and the requisite spring movement at the rear axle is ±100 mm. In this case there is used a fibre-reinforced tubular shaft having a length of 1500 mm, an inner diameter of 25 mm and an outer diameter of 31 mm. The fibre content was 60% and the winding angles were between ±43° and ±47°. The fibre used was a carbon fibre designated Torayca T300, the plastics material comprising a DGEBA-type epoxy resin hardened with an acid anhydride hardener. The shaft was provided at one end with a fixed flange connection, while the other end of the shaft was provided with a splined coupling so as to reduce the stresses on the gearbox. No universal joints were required, since, when using this shaft, having a Young's modulus when bending of 1930 kp/mm$^2$, the requisite spring movements could be taken up by bending of the shaft, without exceeding the maximum allowable bending stress at any point of the shaft.

The aforementioned dimensions and values should only be regarded as typical examples, since they must always be adjusted from case to case, inter alia depending upon the transmission length and the extent of the springiness of the suspension and on the torque and engine speed requirements. The example shows, however, that a flexible shaft according to the invention rigidly attached at both ends obviates the need for universal joints in, for example, the type of transmission systems now used in automobiles.

A flexible drive shaft according to the invention can also be provided with a fixed flange coupling at both ends thereof, i.e. omitting the aforementioned splined coupling. Variations in the distance between the attachment locations are then taken up by bending of the shaft.

Although the transmission system has been described mainly with reference to torque transmission in vehicles, it will be seen that the system can be used to equal advantage in other connections where corresponding problems exist. In addition to carbon fibres other fibres, such as glass fibres, Kevlar fibres and boron fibres can be used alone or in combination with carbon fibres. The plastics material is suitably an epoxy resin. A common factor of all fibre-reinforced materials of this kind is that they have a much higher mechanical strength than simple steel grades and that they are much lighter than steel, and hence a transmission system according to the invention is much lighter than a conventional universal drive shaft system and requires less material than such a system.

In order to obtain precise orientation of the fibres, the shaft can be provided with a pre-impregnated fibre fabric or the like, instead of winding on the fibres. Woven fibre-material fabrics, or fabrics manufactured in some other way, can thus be applied to a mould core in a manner such as to ensure that the fibres extend in the desired directions relative to the longitudinal axis of the shaft. The mould core is removed when hardening is complete. This technique may be preferred in the case of mass-produced drive shafts.

I claim:

1. In an automobile drive train system for transmitting essential torque between an input drive member of the automobile and an output driven member of the automobile, the relative positions of which can significantly change within certain limits, said input drive member being the output shaft of the gear box of the automobile, and said output drive member being the pinion shaft of the rear axle differential of the automobile, said system including a flexible shaft of fibre-reinforced plastic material connecting said members together, the combination in which the two ends of the shaft are rigidly fixed, without intermediate flexing means, to respective ones of said members so that bending moments can be transferred between the shaft and the members, and the shaft has a sufficiently low Young's modulus in the longitudinal direction and low flexural stiffness to enable any positional changes between said members to be taken up by bending of the shaft without exceeding the maximum allowable bending stress thereof, the shaft having the form of a coreless tubular shaft in which the tubular wall comprises a substantially homogeneous material with the fibres distributed substantially uniformly over the whole cross-section, and wherein the fibers extend substantially in the directions of the main stresses in torsion and form an angle of between ±40° and ±50°, preferably between 35 43° and ±47°, with the longitudinal axis of the shaft and wherein no fibers extend substantially parallel with the longitudinal axis of the shaft, to provide a shaft having maximum torsional stiffness and low flexural stiffness and having the capability of withstanding a displacement between its ends of ±100 mm at a shaft length of 1,500 mm without exceeding said maximum allowable bending stress of the material, to enable said positional changes between said input drive member and said output drive member which are caused by the automobile's suspension system.

2. A drive train system according to claim 1, wherein the shaft is fixed at at least one end therof by means of a splined rigid coupling.

* * * * *